US012626207B2

(12) United States Patent   (10) Patent No.: US 12,626,207 B2
Calado et al.   (45) Date of Patent: May 12, 2026

(54) SYSTEM AND METHOD FOR INTEGRATING A DATA RISK MANAGEMENT ENGINE AND AN INTELLIGENT GRAPH PLATFORM

(71) Applicant: KPMG LLP, New York, NY (US)

(72) Inventors: Joao Pedro Seixas Calado, Birmingham, MI (US); Osman Santos Figueroa, Atlanta, GA (US); Michael James Henzey, Purcellville, VA (US); Ranjan Vivek Mannige, Berkeley Lake, GA (US)

(73) Assignee: KPMG LLP, New York, NY (US)

( * ) Notice: Subject to any disclaimer, the term of this patent is extended or adjusted under 35 U.S.C. 154(b) by 112 days.

(21) Appl. No.: 17/897,814

(22) Filed: Aug. 29, 2022

(65) Prior Publication Data

US 2023/0061234 A1    Mar. 2, 2023

Related U.S. Application Data

(60) Provisional application No. 63/237,610, filed on Aug. 27, 2021.

(51) Int. Cl.
*G06Q 10/0635* (2023.01)
*G06F 21/57* (2013.01)

(52) U.S. Cl.
CPC ....... *G06Q 10/0635* (2013.01); *G06F 21/577* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 8,256,004 B1* | 8/2012 | Hill | ........................ | G06Q 10/00 |
| | | | | 726/28 |
| 10,019,677 B2* | 7/2018 | Gill | ..................... | G06Q 10/067 |
| 2002/0129221 A1* | 9/2002 | Borgia | ............ | G06Q 10/06311 |
| | | | | 712/1 |

(Continued)

OTHER PUBLICATIONS

Perera, Jeevan, and Jerry Holsomback. "An integrated risk management tool and process." 2005 IEEE Aerospace Conference. IEEE, 2005 (Year: 2005).*
Flowerday, Stephen, and Rossouw Von Solms. "Real-time information integrity= system integrity+ data integrity+ continuous assurances." Computers & Security 24.8 (2005): 604-613 (Year: 2005).*

(Continued)

*Primary Examiner* — Darlene Garcia-Guerra
(74) *Attorney, Agent, or Firm* — Hunton Andrews Kurth LLP

(57) ABSTRACT

The invention relates to computer-implemented systems and methods for data risk management that provides traceability across governing artifacts which is key to driving effective data risk management and achieving compliance to policy, standards and controls. An embodiment of the present invention is directed to a standardized data risk taxonomy, harmonized classification schema, policy and standard hierarchy, control catalog and standard of care. These components facilitate an alignment to a full information lifecycle with a common definition of data risk, traceability across governing artifacts (e.g., obligations, policies, standards, risks, controls, etc.) and standardized catalogs with defined treatment across harmonized classification of assets.

21 Claims, 6 Drawing Sheets

(56) References Cited

U.S. PATENT DOCUMENTS

| | | | | |
|---|---|---|---|---|
| 2008/0282320 | A1* | 11/2008 | DeNovo | G06F 21/604 |
| | | | | 726/1 |
| 2010/0095235 | A1* | 4/2010 | Bennett | G06Q 99/00 |
| | | | | 715/781 |
| 2015/0356477 | A1* | 12/2015 | Milkman | G06Q 10/0633 |
| | | | | 705/7.27 |
| 2016/0232358 | A1* | 8/2016 | Grieco | G06F 21/577 |
| 2017/0235569 | A1* | 8/2017 | Sturtevant | G06Q 40/12 |
| | | | | 717/102 |
| 2018/0069899 | A1* | 3/2018 | Lang | G06F 40/186 |
| 2018/0146004 | A1* | 5/2018 | Belfiore, Jr. | H04L 63/1433 |
| 2021/0133331 | A1* | 5/2021 | Lipkis | H04L 63/1483 |
| 2021/0367963 | A1* | 11/2021 | Murray | H04L 63/20 |
| 2022/0103586 | A1* | 3/2022 | Shao | H04L 63/1433 |
| 2023/0031994 | A1* | 2/2023 | Jarvis | G06Q 10/06375 |

OTHER PUBLICATIONS

Bassetto, Samuel, Ali Siadat, and Michel Tollenaere. "The management of process control deployment using interactions in risks analyses." Journal of Loss Prevention in the Process Industries 24.4 (2011): 458-465 (Year: 2011).*

Thekdi, Shital, and Terje Aven. "An enhanced data-analytic framework for integrating risk management and performance management." Reliability Engineering & System Safety 156 (2016): 277-287 (Year: 2016).*

Labodová, Alena. "Implementing integrated management systems using a risk analysis based approach." Journal of cleaner production 12.6 (2004): 571-580 (Year: 2004).*

International Searching Authority, PCT Notification of International Search Report and Written Opinion, International Application No. PCT/US22/41878, Dec. 29, 2022, pp. 1-12.

* cited by examiner

SYSTEM AND METHOD FOR INTEGRATING A DATA RISK MANAGEMENT ENGINE AND AN INTELLIGENT GRAPH PLATFORM

CROSS-REFERENCE TO RELATED APPLICATION

This application claims priority to U.S. Provisional Application Ser. No. 63/237,610, filed Aug. 27, 2021, the contents of which are incorporated by reference herein in their entirety.

FIELD OF THE INVENTION

The present invention relates to systems and methods for effective data risk management and compliance to obligations (external and/or internal), policy, standards, risks and controls through a standardized data risk taxonomy, harmonized classification schema, policy and standard hierarchy, control catalog and standard of care. This enables coverage and traceability, prioritization of assets to bring under governance, quantification of risk profiles and alignment to a data risk taxonomy, real-time reporting and monitoring of data risk and control environment, and further sets the foundation for data driven predictive analytics to infer causal relationships and impact to an organizations risk profile.

BACKGROUND

In recent years, organizations have deployed a variety of capabilities to understand, manage and use data to drive business growth, improve operating efficiencies and introduce specialized products and personalized services for their customers. This expansion in the use and monetization of data has become an urgent focus of regulators. As external pressures increase to hold organizations and executives accountable to govern and protect data in their control, many organizations are facing challenges with how to effectively and sustainably manage data-related risks.

Accordingly, with current systems, data and processes, there are challenges relating to coverage issues, fragmented governance, prioritization of assets to deploy appropriate controls, assurance levels and harmonized classification frameworks.

Coverage issues relate to data risk being a distributed discipline with accountabilities sitting with team members across the organization making it challenging to effectively manage and report on data risk holistically. Oftentimes, accountability is either unclear or distributed across the organization without a consistent data risk taxonomy pulling it all together. Fragmented governance refers to disparate and siloed policies and standards that lack cohesion and clear guidance on meeting internal and external obligations. For example, a single organization may rely on many different policies, some with varying (or non-existent) definitions on classification levels and governance. There is an abundance of controls and metrics to monitor compliance with policies and standards but also confusion over ownership and integration across the organization and how they help to reduce risk exposure. Current systems face challenges aggregating, reconciling, analyzing and applying different methods for categorizing (e.g., criticality, sensitivity) and treating data. Prioritization of assets refers to an organization's desire to deploy controls in a systematic, pragmatic and defensible manner with often competing business priorities and limited resources. While many approaches deployed by organizations today either prioritize based on perceived risk reduction or the value generated by the asset, most do not account for both and further do not provide a methodology that would stand up to scrutiny by other parties.

An additional complication is the struggle to measure data risk in a quantifiable fashion—as opposed to qualitative measures—in a manner that is scalable, sustainable and comprehensive. In an effort to provide an organization's senior leadership with information to make decisions that prioritize spend and avoid or mitigate risk, data risk management professionals often provide either subjective (e.g., low, medium and high) ratings that rely mainly on judgment of the data risk professional, or they report "proxy metrics" (e.g., an assortment of metrics collected from systems—for instance, how many alerts were issued by the data loss prevention system). However, these "proxy metrics" fail to provide a comprehensive picture of the data risk position for the organization. Moreover, they are often not aligned to an organizational hierarchy that enables efficient aggregation for reporting purposes.

It would be desirable, therefore, to have a system and method that could overcome the foregoing disadvantages of known systems and improve data risk management and compliance with obligations, policy and standards as well as seamlessly incorporate data risk metrics.

SUMMARY

According to an embodiment, the invention relates to a computer-implemented system for data risk management. The system comprises: an interface coupled to a client environment; a graph database that stores and manages a variety of data, wherein the variety of data comprises one or more of the following data types: at least one obligation represented by at least a portion of an entire law or regulation; at least one industry best practice represented by at least a portion of an entire industry best practice document; at least one mandate represented by one or more individual requirements identified from the at least one obligation and the at least one industry best practice; at least one policy represented by one or more documents within an organization that establishes one or more high-level operational requirements; at least one policy statement represented by one or more individual requirements identified from one or more policies; at least one standard represented by one or more documents subservient to a parent policy within an organization that contains more detailed requirements than its parent policy; at least one standard statement represented by one or more individual requirements identified from the at least one standard; at least one risk represented by one or more risk statements that identify and describe a particular potential manifestation of a threat and its impact upon an organization; at least one control objective represented by one or more control statements describing activities that must be conducted in order to mitigate risk and/or to satisfy one or more mandates wherein one or more control objectives are derived from the one or more control statements; at least one control represented by documentation of activities that are performed to mitigate risk and/or to satisfy one or more mandates; at least one asset represented by things of value within an organization that require governance, protection and management; at least one key control indicator represented by a numerical measure of performance of one or more controls; a set of sensitivity classification tiers represented by a series of sensitivity labels that are associated with one or more control objectives indicating that at least one control objective applies to an identified sensitivity tier; and a set of criticality classification tiers represented by a series of criticality labels that are associated with one or more control objectives indicating that at least one control objective applies to an identified criticality tier; an intelligent graph platform coupled to the graph database, the intelligent graph platform representing how data is structured through a plurality of connected relationships; and a data risk management engine comprising a computer processor and coupled to the interface and the intelligent graph platform, the data risk management engine configured to perform the steps of: receiving a query that identifies a dataset based upon one or more pre-configured rules; responsive to the query, identifying and displaying a curated dataset based upon an entered sensitivity classification tier wherein a first population of control objectives that have previously been associated with the entered sensitivity tier are collated; identifying and displaying another curated dataset based upon an entered criticality classification tier wherein a second population of control objectives that have previously been associated with the entered criticality classification tier are collated; responsive to the query for sensitivity and criticality tier, producing a set of expected control objectives for data commensurate with the identified sensitivity tier and identified criticality tier; generating a graphical representation illustrating a first set of relationships between one or more of: the control objectives, the policies, the policy statements, the standards, the standard statements, the mandates, the obligations, and the industry best practices; generating a graphical representation illustrating a second set of relationships between data components comprising the control objectives and information from the client environment; and transmitting the graphical representations to an interactive user interface through a communication network.

According to another embodiment, the invention relates to a computer-implemented method for data risk management. The method comprises the steps of: storing and managing, in a graph database, a variety of data, wherein the graph database is coupled to an intelligent graph platform that represents how data is structured through a plurality of connected relationships, and wherein the variety of data comprises one or more of the following data types: at least one obligation represented by at least a portion of an entire law or regulation; at least one industry best practice represented by at least a portion of an entire industry best practice document; at least one mandate represented by one or more individual requirements identified from the at least one obligation and the at least one industry best practice; at least one policy represented by one or more documents within an organization that establishes one or more high-level operational requirements; at least one policy statement represented by one or more individual requirements identified from one or more policies; at least one standard represented by one or more documents subservient to a parent policy within an organization that contains more detailed requirements than its parent policy; at least one standard statement represented by one or more individual requirements identified from the at least one standard; at least one risk represented by one or more risk statements that identify and describe a particular potential manifestation of a threat and its impact upon an organization; at least one control objective represented by one or more control statements describing activities that must be conducted in order to mitigate risk and/or to satisfy one or more mandates wherein one or more control objectives are derived from the one or more control statements; at least one control represented by documentation of activities that are performed to mitigate risk and/or to satisfy one or more mandates; at least one asset represented by things of value within an organization that require governance, protection and management; at least one key control indicator represented by a numerical measure of performance of one or more controls; a set of sensitivity classification tiers represented by a series of sensitivity labels that are associated with one or more control objectives indicating that at least one control objective applies to an identified sensitivity tier; and a set of criticality classification tiers represented by a series of criticality labels that are associated with one or more control objectives indicating that at least one control objective applies to an identified criticality tier; receiving, via an interface coupled to a client environment, a query that identifies a dataset based upon one or more pre-configured rules; responsive to the query, identifying and displaying, via a data risk management engine, a curated dataset based upon an entered sensitivity classification tier wherein a first population of control objectives that have previously been associated with the entered sensitivity tier are collated; identifying and displaying another curated dataset based upon an entered criticality classification tier wherein a second population of control objectives that have previously been associated with the entered criticality classification tier are collated; responsive to the query for sensitivity and criticality tier, producing a set of expected control objectives for data commensurate with the identified sensitivity tier and identified criticality tier; generating a graphical representation illustrating a first set of relationships between one or more of: the control objectives, the policies, the policy statements, the standards, the standard statements, the mandates, the obligations, and the industry best practices; generating a graphical representation illustrating a second set of relationships between data components comprising the control objectives and information from the client environment; and displaying, via an interactive user interface, the graphical representations through a communication network.

An embodiment of the present invention provides effective data risk management through a standard of care approach. This approach defines a classification methodology and suites of control objectives across subdomains of data risk (e.g., data management risk, information security risk, privacy risk, etc.) that are aligned to "tiers" of sensitivity classification and criticality classification. This enables a simple and uniform approach to articulating a collection of varying control objectives that may be applied to protect and manage data across subdisciplines, and for enabling custodians of data to determine the full population of control objectives that are required based upon classifying the data in question. Furthermore, control objectives may be tied into a policy hierarchy that include: a standardized risk taxonomy, mappings to external obligations and industry best practices, policy and policy statements, standard and standard statements. Thus, each control objective in the standard of care approach may be mapped to the governance artifacts that are most relevant in a corporate risk management environment. Documenting and executing a control that is mapped to a control objective provides seamless evidence of compliance with each governance artifact pre-mapped to the control objective. Stakeholders may be aligned through common definitions of data risk established by the risk taxonomy and clearly defined accountabilities across those risk stripes. Furthermore, the standardized risk and control objectives catalogs with defined treatment levels provide an opportunity to simplify and rationalize the control population. An embodiment of the present invention seeks to harmonize practices of categorizing data and create a "one-stop shop" for expected controls to be applied commensurate with its classification.

This results in the ability to optimize and share investments; provides traceability and transparency to simplify compliance and gap assessments; enables rationalizing governance (e.g., standards, risks, control artifacts, etc.); supports systematic aggregation and reporting on data risk as well as preparedness/level of adaptability to new requirements.

The standard of care ontology may be further enriched by incorporating a Data Risk Metrics Methodology ("DRMM"). The DRMM represents an approach that takes various information inputs that are already typically recorded in an organization's Governance, Risk and Compliance (GRC) system (e.g., control design and operating effectiveness test results, risk scores, major and minor issues); translates the various inputs into normalized scores on a scale (e.g., 1-5 scale); aggregates and weighs the input scores based upon a pre-defined logic; and layers the score upon an existing standard of care ontology at various levels. The scores may then be ingested into a graph database as additional properties that reside on a relevant graph node. Further, the utilization of the graph database provides additional information inputs that may be utilized by the DRMM. For example, the graph may take advantage of network analysis to weigh the nodes' centrality (e.g., the number of relationships associated with the node) within an overall network. This may provide an additional weighting that helps estimate relative importance of a node, which may affect an overall score assigned.

Accordingly, an embodiment of the present invention achieves improved and comprehensive data risk management through traceability and transparency to simplify compliance, reporting and gap assessments to obligations, policies and standards, rationalized governance, systematic aggregation and reporting on data risk, optimization and ability to share investments and increase preparedness and adaptability to analyze new requirements currently unavailable with existing solutions.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

An embodiment of the present invention is directed to a data risk management solution that provides traceability across governing artifacts which is key to driving effective data risk management and achieving compliance to policy standards and controls.

An embodiment of the present invention is directed to a standardized data risk taxonomy, harmonized classification schema, policy and standard hierarchy, control catalog and standard of care. These components facilitate an alignment to a full information lifecycle with a common definition of data risk, traceability across governing artifacts (e.g., obligations, policies, standards, risks, controls, etc.) and standardized catalogs with defined treatment across harmonized classification of assets.

Organization alignment may be supported by an information lifecycle management framework, service catalog and operating model. Alignment of stakeholders and defined accountabilities across different data risk stripes may be achieved while taking advantage of the use of shared capabilities.

Real-time control monitoring supports timely reporting and monitoring of the risk and control environment, as well as automated reporting to reduce data quality errors and strain on resources associated with manual calculations. Enhanced reporting may include credible challenge/effective oversight, standardized reporting/dashboards, etc.

Advanced analytics provide predictive insights, including the calculation of a risk score as a leading indication of future exposure, driving proactive risk remediation or mitigation before materialized loss as well as drive operational enhancements. This enables users to view how risk is being managed and to accurately determine risk exposure. Additional features may include risk quantification (e.g., DRMM), quantitative risk appetite statement and computational risk management.

Figure 1:
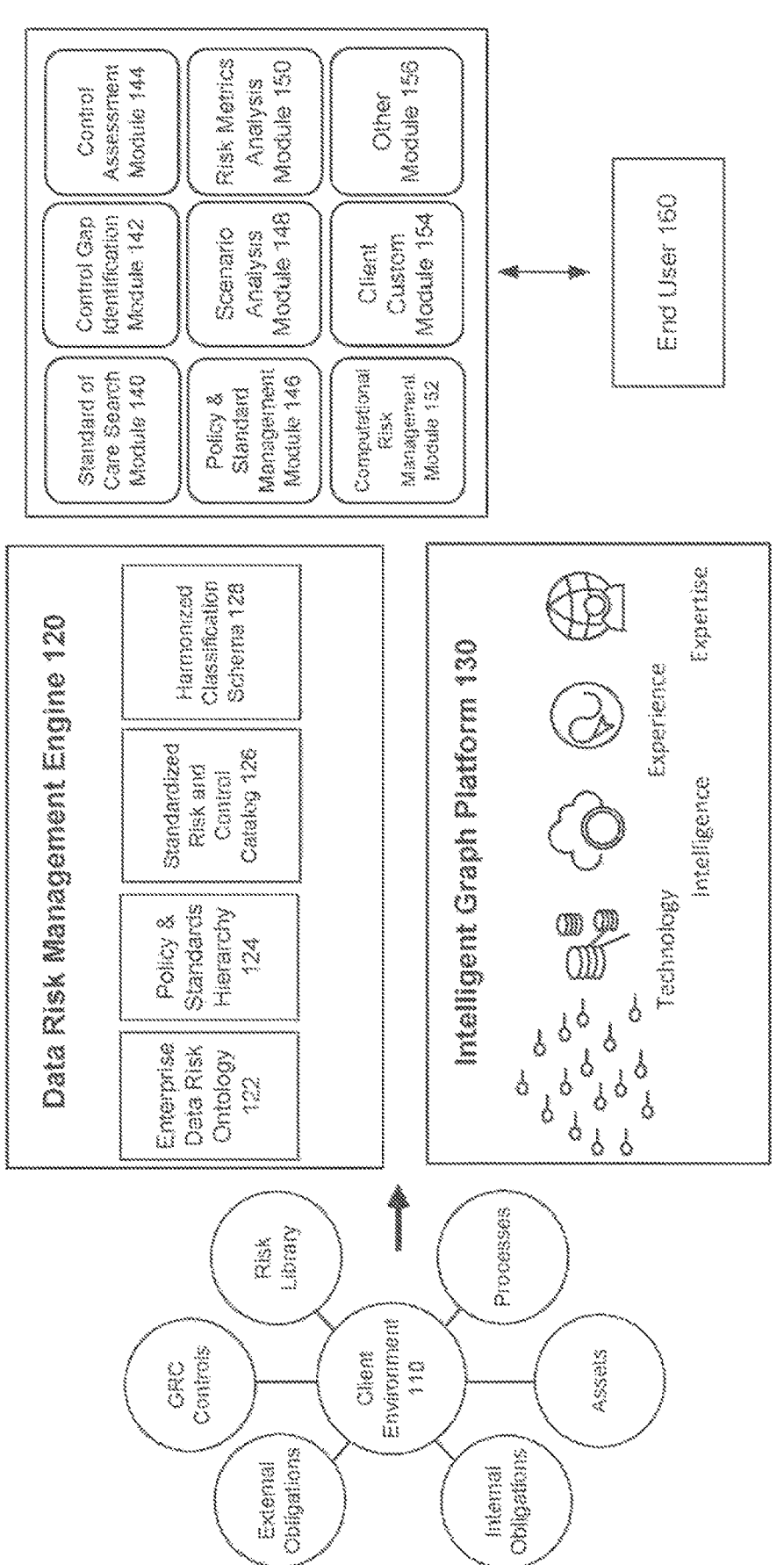
FIG. 1 is an exemplary system diagram, according to an embodiment of the present invention.

FIG. 1 is an exemplary system diagram, according to an embodiment of the present invention. The graph solution of an embodiment of the present invention may be implemented in various systems and infrastructures. Within a client environment 110, the graph solution may support a Data Risk Management Engine 120 (standard of care) and an Intelligent Graph Platform 130. The Data Risk Management Engine 120 may support an Enterprise Data Risk Ontology 122, Policy and Standards Hierarchy 124, Standardized Risk and Control Catalog 126, and Harmonized Classification Schema 128. The Data Risk Management Engine 120 determines expected controls for data commensurate with its classification. The Intelligent Graph Platform 130 represents an integrated platform of graph database technology that serves as a framework to explore, test and rapidly bring graph-based use cases to market.

An embodiment of the present invention is directed to an ontology that forms a data model integrated with an innovative intelligent graph technology. An embodiment of the present invention provides a graph based solution that may be applied to various use cases, applications and scenarios relating to managing data risk. Users may include stakeholders such as chief data officer, data owners, chief risk officer, risk professionals as well as information security officers, chief information officer, compliance officers, privacy officers, etc.

An embodiment of the present invention is directed to a novel way of classifying data and applying an appropriate level of risk and control. For example, financial services organizations may seek to solve challenges relating to identifying, organizing and managing risk related to the data within their organization. According to an embodiment of the present invention, standard of care may define what constitutes data risk and different types of data risk through a taxonomy. The standard of care may also identify corresponding risk statements and controls to manage various types of risk.

An embodiment of the present invention is directed to a harmonized classification schema that supports a unique approach to classifying data within an organization. This classification schema aligns different groups within the organization around a common way to classify data. Historically, information security officers and risk officers tend to be most concerned with sensitivity level of data. This generally refers to whether data would damage the organization (in the form of legal or regulatory fines, loss of business advantage, loss of reputation through negative publicity) if accessed, disclosed or used without authorization. Sensitive data is often assigned a sensitivity classification tier that corresponds to the location in a range that indicates the sensitivity of the data (e.g., a "restricted" label may be assigned to the most sensitivity data requiring greatest amount of control; a "public" label may be assigned to the least sensitivity data requiring the least amount of control, etc.). Data officers within organizations are more concerned with criticality of data. This may relate to whether data is critical to regulatory reporting, financial reporting, decision making, etc. An embodiment of the present invention is directed to an innovative and unique schema that harmonizes data in relation to criticality and sensitivity as well as other classifications and categories.

An embodiment of the present invention provides simplification and clarity to accountability, improved governance, unified reporting as well as transparency and traceability that are currently unavailable with existing systems. The ontology of an embodiment of the present invention provides a comprehensive and consistent view on various obligations, policies, standards, risks, controls, processes and assets. Accordingly, the data model provides a blueprint of the obligations, policies, standards, risks, controls, processes and assets for execution.

An embodiment of the present invention is directed to an interactive interface that supports various use cases. For example, an intelligent graph user interface may interact with users to support searches for information, navigate through a graph, understand a current state and ascertain best practices. Users may further understand gaps, monitor risk management, understand coverage and compliance with specific obligations, policies and standards, view different scenarios and measure state.

An exemplary user interface may include a series of tiles, buttons and/or other interactive icons. For example, a user (e.g., data owner) may interact with a tile to perform a search within a graph and/or perform a gap assessment of control. The options available may be based on the user's role, permissions, privileges, access controls, etc.

As shown in FIG. 1, various use cases may be supported by modules including Standard of Care Search Module 140, Control Gap Identification Module 142, Control Assessment Module 144, Policy and Standard Management Module 146, Scenario Analysis Module 148, Risk Metrics Analysis Module 150, Computational Risk Management Module 152 and Client Custom Module 154. Other functions and features may be supported, as represented by Other Module 156. End Users 160 may represent users such as data professionals, risk professionals, privacy professionals and information security professionals. End Users 160 may access modules through an interactive user interface via a communication network.

Standard of Care Search Module 140 provides query information within the Standard of Care based on a user's custom search parameters.

Control Gap Identification Module 142 provides controls associated with a specific control objective and compares it with client controls to identify whether there are gaps in coverage.

Control Assessment Module 144 assesses whether the controls associated with a specific control objective satisfy its requirements.

Policy and Standard Management Module 146 manages and analyzes corporate requirements.

Scenario Analysis Module 148 conducts "what-if" analysis to understand impacts of changes within a client's data risk ecosystem.

Risk Metrics Analysis Module 150 independently calculates and validates risk metrics.

Computational Risk Management Module 152 utilizes predictive analytics to calculate forward-looking risk profiles.

Client Custom Module 154 designs and builds additional custom use cases based on a client's unique needs. Other factors may be considered.

An embodiment of the present invention is directed to governing policy and standards data. For example, risk may be articulated as policy statements or minimum requirements within standards. An embodiment of the present invention may codify risks in terms governance, policy and standards and then identify linkage and corresponding relationships.

Policy and standards may be linked to external obligations and practices. For example, a consumer privacy act may impose additional requirements which may be linked to policy and standards that specify how to manage the risk associated with storing consumer data, identifying the data and/or protecting the data. Also, policy and standards may link to national standards information and other external sources. With an embodiment of the present invention, an entity, such as an organization, may manage a specific risk with a set of controls that comply with policies and standards. This ensures compliance with external and/or other obligations and alignment with leading practices.

With an embodiment of the present invention, data may be evaluated from different perspectives and use cases. The same data may be used by different groups within an organization. For example, different stakeholders within an organization may each have a different level of responsibility for identification of data risk and management.

An embodiment of the present invention is directed to a data model and intelligent graph platform that applies a common definition of data risk to define accountabilities and better understand different risks within an organization. For example, a chief data officer may be responsible for managing data integrity and quality. With an embodiment of the present invention, the chief data officer may be equipped with tools to effectuate data quality checks and perform reporting/analytics. In another example, a chief information security officer may have access to tools to determine data security and identify who has access to what data under what conditions.

The graph solution of an embodiment of the present invention facilitates connections with other systems, infrastructures and/or data sources. With the graph solution, organizations have an always on capability which enables more checks and queries. This promotes improved quality, precision and accuracy over current systems. In addition, the graph solution provides a representation of multidimensional connections and relationships that enables organizations to view risk management from different perspectives. This may be achieved through a risk taxonomy, policy and standards integration and control catalog.

An exemplary use case may include a Standard of Care search, as supported by Module 140. The Graph Solution may store data from the Standard of Care and a client's environment and map associated relationships. This provides a user the ability to efficiently search the Standard of Care, specifying desired views and relationships to be modeled. In this example, a user may easily query what requirements are associated with a specific data asset based on its classification.

According to an exemplary embodiment, inputs may include: Standard of Care (e.g., standardized data risk ontology, policy and standard hierarchy, risk and control catalog, mappings to key external obligations (e.g., Basel Committee on Banking Supervision (BCSB) standard number 239, other principles for risk data aggregation and risk reporting), mappings to key industry standards (e.g., National Institute of Standards and Technology (NIST), Control Objectives for Information and Related Technology (COBIT), Data Management Capability Assessment Model (DCAM), etc.)); and information from the client's environment (e.g., external and internal obligations, governance risk and compliance (GRC) control, risk library, assets, processes, etc.).

In addition, outputs may include: a graphical representation showing the relationships between components of the Standard of Care and information from the client's environment in order to help visualize answers to target questions; and an ability to conduct ad hoc searches within the Standard of Care and integrated client data.

This addresses challenges involving: many disparate and siloed policies and standards that make understanding and querying information difficult; difficulty reconciling different methods for categorizing data or information (e.g., criticality, sensitivity, etc.) and treating data; difficulty mapping external and internal obligations to specific requirements and governance artifacts; and trouble with quickly understanding what controls are designed to accomplish desired objectives and grouping similar controls together.

Another exemplary use case may include Control Gap Identification, as supported by Module 142. A user may search the Graph Solution to identify what controls are mapped to a specific control objective. The user may determine visually whether or not there are any associated controls mapped to a specific control objective thereby understanding coverage of control objectives to mitigate risks and potential areas of non-compliance with obligations. The user may then export the view to a customized report or other output. The absence of controls associated with a control objective may potentially indicate a control gap.

According to an exemplary embodiment, inputs may include: Standard of Care (e.g., standardized data risk ontology, policy and standard hierarchy, risk and control catalog, mappings to key external obligations (e.g., BCSB239), mappings to key industry standards (e.g., NIST, COBIT, DCAM)); and information from the client's environment (e.g., external and internal obligations, GRC control, risk library, assets, processes, etc.).

In addition, outputs may include: a graphical representation highlighting potential gaps in control coverage or non-compliance with applicable obligations.

This addresses challenges involving: difficulty identifying areas of risk exposure in an organization where there are no controls associated with a specific control objective (e.g., control gap) and therefore the corresponding risk may not be fully or partially mitigated.

Another exemplary use case may include Control Assessment, as supported by Module 144. A user may search the Graph Solution to identify what controls are mapped to a specific control objective. The user may then assess whether or not these associated controls satisfy the requirements of the control objective. The Graph Solution facilitates this assessment by: (1) comparing the descriptions of a group of controls to the requirements of the control objective and the risk description, and (2) identifying if these controls are designed and operating as intended. Given that one or more controls can be mapped to a control objective, it is important that the Graph Solution looks at the coverage of controls and their performance in aggregate.

According to an exemplary embodiment, inputs may include: Standard of Care (e.g., standardized data risk ontology, policy and standard hierarchy, risk and control catalog, mappings to key external obligations (e.g., BCSB239), mappings to key industry standards (e.g., NIST, COBIT, DCAM)); and information from the client's environment (e.g., external and internal obligations, GRC control, risk library, assets, processes, etc.).

In addition, outputs may include: graphical representation of controls mapped to a control objective; graphical representation showing if controls meet the requirements of the control objectives based on (1) a comparison of the control descriptions to the control objective and risk description, and (2) an assessment of the control performance (e.g., if the controls are designed and operating as intended); and an indication of whether or not a group of controls are meeting the requirements of a control objective.

This addresses challenges involving: difficulty assessing if controls within an organization satisfy the requirements of a control objective (and by extension comply with applicable obligations); difficulty identifying if controls are appropriately mapped to a control objective; and difficulty understanding if controls mapped to a control objective are designed and operating effectively.

Another exemplary use case may include Policy/Standard Management, as supported by Module 146. The Graph Solution may be used as a dynamic and digitized repository for maintaining and analyzing corporate requirements (e.g., the requirements within policies and standards) as individual objects. This allows organizations to more efficiently govern and manage polices and standards by (1) standardizing and rationalizing requirements, (2) linking requirements to other information such as external obligations, risk taxonomy, other corporate requirements, controls, issues/exceptions, etc., (3) recording metadata about corporate requirements and their relationships, and (4) enabling a self-service function that can scope requirements as "on" or "off" based upon data classification, risk, or other criteria.

According to an exemplary embodiment, inputs may include: Standard of Care (e.g., standardized data risk ontology, policy and standard hierarchy, risk and control catalog, mappings to key external obligations (e.g., BCSB239), mappings to key industry standards (e.g., NIST, COBIT, DCAM)); and information from the client's environment (e.g., external and internal obligations, GRC control, risk library, assets, processes, etc.).

In addition, outputs may include: a searchable repository of requirements; and corporate requirements mapped to relevant objects.

This addresses challenges involving: time consuming and inflexible processes to update policies and standards; difficulty identifying, isolating, and describing discrete, individual requirements (rather than groups of requirements) from policies and standards; manual mapping of corporate requirements to external obligations; difficultly demonstrating compliance in response to internal (e.g., management) or regulatory inquiry/audit; and inefficiencies, inconsistencies and incomplete coverage from writing and maintaining policies in silos instead of as part of an entire ecosystem.

Another exemplary use case may include Scenario Analysis, as supported by Module 148. The Graph Solution may model relationships between components of the Standard of Care and a client's environment. This allows a user to run different "what-if" analyses to better understand and quantify impacts of changes within the data risk ecosystem. Impacts may be both upstream and downstream from any modeled change within the Graph Solution.

According to an exemplary embodiment, inputs may include: Standard of Care (e.g., standardized data risk ontology, policy and standard hierarchy, risk and control catalog, mappings to key external obligations (e.g., BCSB239), mappings to key industry standards (e.g., NIST, COBIT, DCAM)); and information from the client's environment (e.g., external and internal obligations, GRC control, risk library, assets, processes, etc.)

In addition, outputs may include: a graphical representation of scenario and associated impacts to components of the Standard of Care and information from the client's environment.

This addresses challenges involving: difficulty for a user to understand and quantify impacts (including both upstream and downstream) to a change (addition, modification, or removal) within the data risk data ecosystem.

Another exemplary use case may include Risk Metric Analysis, as supported by Module 150. Risk Professionals may use the Graph Solution to perform independent analysis of risk metrics, including Key Control Indicators (KCIs) and Key Risk Indicators (KRIs). The Graph Solution enables accessible data from currently disparate systems, allowing the risk function to validate risk calculations and identify areas of concern. Additionally, risk trends may be identified between metrics and other information within the Graph Solution (e.g., to identify whether risk is centralized or spread out).

According to an exemplary embodiment, inputs may include: Standard of Care (e.g., standardized data risk ontology, policy and standard hierarchy, risk and control catalog, mappings to key external obligations (e.g., BCSB239), mappings to key industry standards (e.g., NIST, COBIT, DCAM)); and information from the client's environment (e.g., external and internal obligations, GRC control, risk library, assets, processes, etc.).

In addition, outputs may include: graphical representation showing the relationships between components of the Standard of Care and information from the client's environment in order to help visualize answers to target questions; and an ability to conduct ad hoc searches within the Standard of Care and integrated client data.

This addresses challenges involving: Risk Professionals over-relying on metrics and information sourced by the first line to make risk decisions and assessments; difficulty for Risk Professionals to independently analyze the reasonableness of risk metrics and validate calculations; and difficulty identifying areas of concern and risk trends that are not evident through current risk metrics or proxy metrics.

Another exemplary use case may include Computational Risk Management, as supported by Module 152. The Graph Solution provides Risk Professionals with the ability to utilize predictive analytics through machine learning and natural language processing and calculate risk profiles and model scenarios. Additionally, Risk professionals may use the graph database to automatically pull near real-time data and leverage analytics to better understand data trends, and identify causal relationships and emerging risks.

According to an exemplary embodiment, inputs may include: Standard of Care (e.g., standardized data risk ontology, policy and standard hierarchy, risk and control catalog, mappings to key external obligations (e.g., BCSB239), mappings to key industry standards (e.g., NIST, COBIT, DCAM)); and information from the client's environment (e.g., external and internal obligations, GRC control, risk library, assets, processes, etc.); Risk Quantification Tool and Associated Inputs; Metrics Analysis (KRI, KCIs, Risk Scores, other metrics) from both the first and second lines and External Signals and Market Data (e.g., newsfeeds, legal texts, etc.).

In addition, outputs may include: calculated risk profiles for the organization; identification of emerging risks and root causes; and changes in risk profile due to introduction of new technologies.

This addresses challenges involving: inability to calculate risk profiles for the organization, including a quantitative level of current and emerging risk compared to established thresholds and Risk Appetite Statement; difficulty with timely identification of risks and root causes; lack of transparency with existing risk score calculations; difficulty understanding how risks interact and influence one another; and difficulty understanding impact on risk profile through introduction of new technologies.

Figure 2:
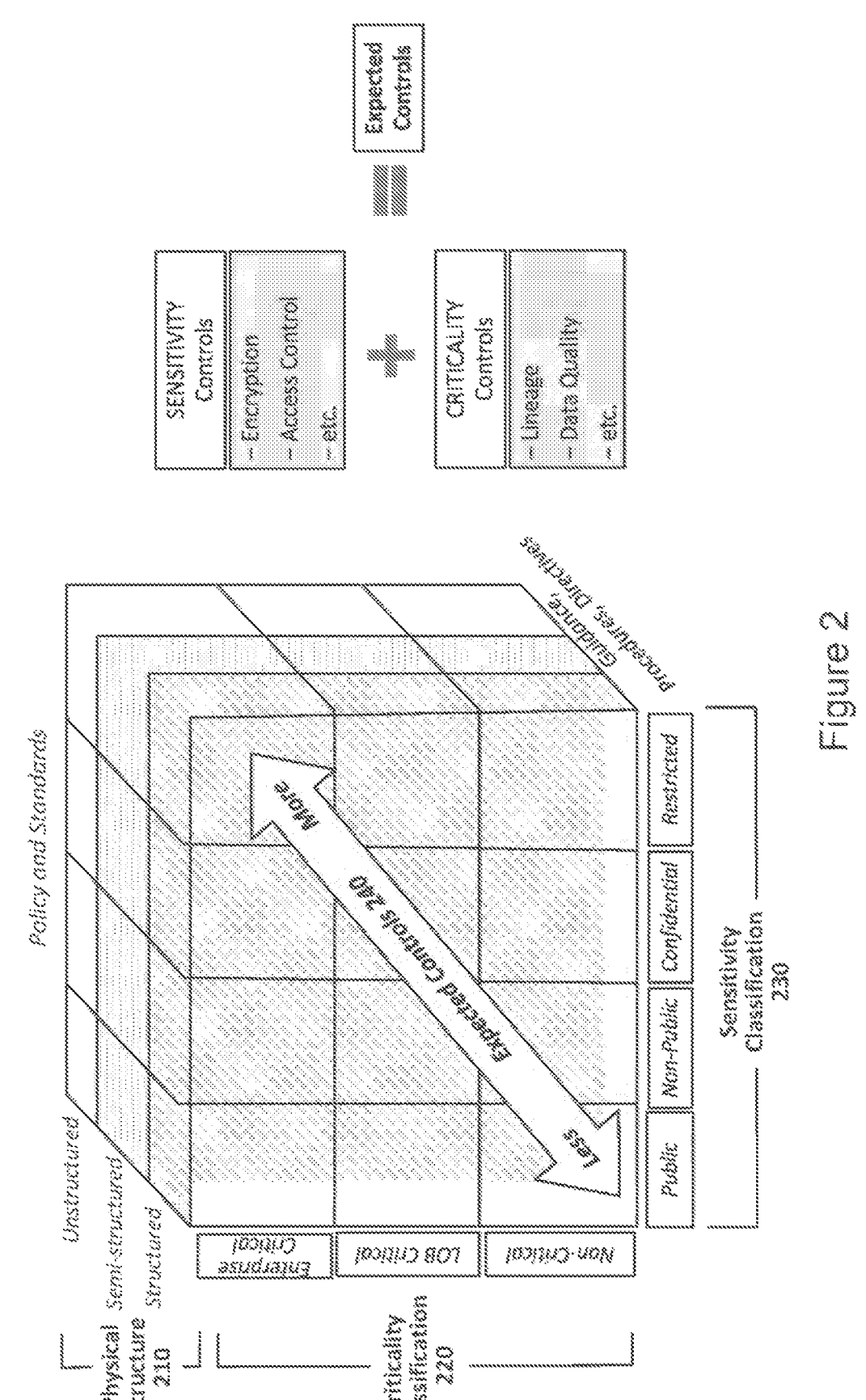
FIG. 2 is an exemplary diagram of a Data Risk Management Engine or Standard of Care, according to an embodiment of the present invention.

FIG. 2 is an exemplary diagram of a Data Risk Management Engine, according to an embodiment of the present invention. The Data Risk Management Engine may implement a standard of care methodology or algorithm to determine expected controls for data commensurate with its classification. The Data Risk Management Engine may harmonize classification practices (e.g., criticality, sensitivity) and provide a "one-stop shop" for expected controls (through a Control Catalog) for consistency, simplification and usability.

As shown in FIG. 2, Criticality Classification 220 may include non-critical, LOB (line of business) critical and enterprise critical. Sensitivity Classification 230 may include public, non-public, confidential and restricted.

Data may include structured, semi-structured, and unstructured, as shown by Physical Structure 210. For structured, controls may be optimized for structured database technologies. For semi-structured, controls may be optimized for documents and communications. For unstructured, controls may be optimized for containers, images and recordings.

With an embodiment of the present invention, expected controls 240 may be identified and implemented. Sensitivity control objectives (e.g., encryption, access control, etc.) and criticality control objectives (e.g., lineage, data quality, etc.) may form the basis for expected controls. Expected controls 240 may combine Sensitivity and Criticality controls to determine a full set of expected control objectives, then check for procedural guidance based on a variety of attributes (e.g., the physical structure of the data, whether the data is hosted in a cloud environment or on premises).

Sensitivity and criticality controls that accomplish the same objectives may be implemented differently on different kinds of data/information platforms. An embodiment of the present invention is further directed to achieving control objectives for variety of attributes (e.g., a given physical structure, hosted in a cloud environment) is provided via guidance, procedures, directives, etc.

Figure 3:
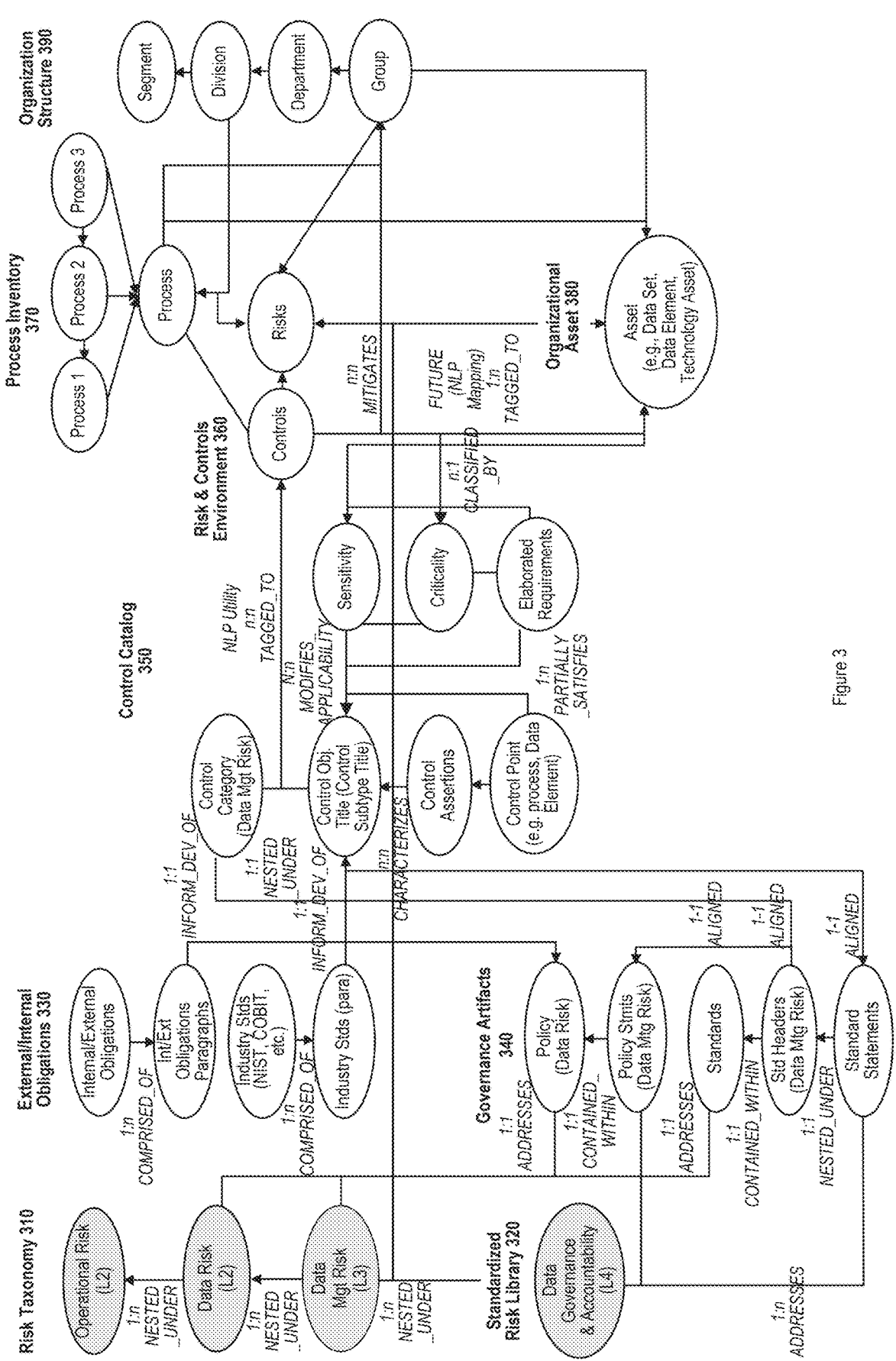
FIG. 3 is an exemplary data model of the Data Risk Management Engine or Standard of Care, according to an embodiment of the present invention.

FIG. 3 is an exemplary standard of care data model, according to an embodiment of the present invention. As shown in FIG. 3, the intelligent graph solution may include Risk Taxonomy 310, Standardized Risk Library 320, External/Internal Obligations 330, Governance Artifacts 340, Control Catalog 350, Risk and Controls Environment 360, Process Inventory 370, Organizational Asset 380 and Organization Structure 390.

Risk Taxonomy 310 may represent operational risk, data risk and data management risk.

Standardized Risk Library 320 may represent data governance and accountability.

External/Internal Obligations 330 may include internal/external obligations, internal/external obligations paragraphs/excerpts, industry standards, and industry standards paragraphs/excerpts.

Governance/Artifacts 340 may include policy (data risk), policy statements (data management risk), standards, standard headers (data management risk) and standard statements.

Control Catalog 350 may represent control category, control objective title, control assertions, control point (e.g., process, data element, etc.), sensitivity, criticality, and elaborated requirements. For example, a Control Catalog may provide minimum controls that need to be in place based on a classification level. A single suite of controls may be used to measure a determination of risk management.

Risk and Controls Environment 360 may represent various controls and risks.

Process Inventory 370 may represent various processes, represented by Process 1, Process 2, Process 3, etc.

Organizational Asset 380 may represent assets such as data set, data element, technology asset.

Organization Structure 390 may include Groups, Departments, Divisions and Segments. Other organization details may be provided.

Figure 4:
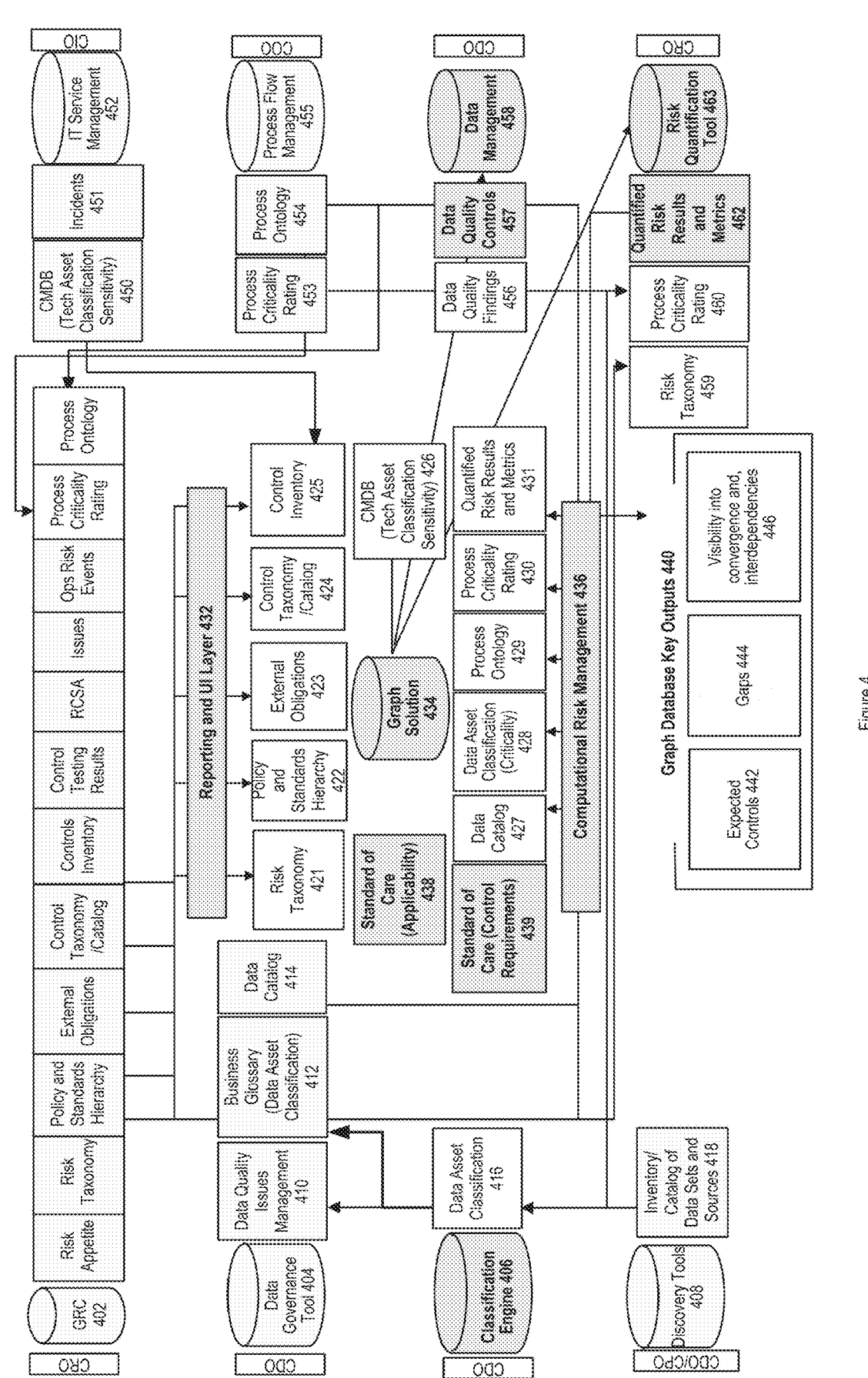
FIG. 4 is an exemplary solution architecture of the Data Risk Management Engine or Standard of Care, according to an embodiment of the present invention.

FIG. 4 is an exemplary standard of care system, according to an embodiment of the present invention. FIG. 4 is an exemplary architecture that depicts the integration of a graph solution within an illustrative data risk ecosystem.

GRC 402 represents a governance, risk, control and compliance management platform. Features and functions may include: Risk Appetite, Risk Taxonomy, Policy and Standards Hierarchy, External Obligations, Control Taxonomy/Catalog, Controls Inventory, Control Testing Results, RCSA (Risk Control Self Assessment), Issues, Operations Risk Events, Process Criticality Rating and Process Ontology.

Data Governance Tool 404 represents a data governance platform that provides tools for data management and stewardship. Features and functions may include: Data Quality Issues Management 410, Business Glossary (including data asset classification) 412, and Data Catalog 414.

Classification Engine 406 may represent an engine with rule logic to classify data assets, as shown by Data Asset Classification 416.

Discovery Tools 408 may represent tools to discover and catalog data assets and their sources, as shown by Inventory/Catalog of Data Sets and Sources 418.

As shown in FIG. 4, Semantic Graph, as shown by Graph Solution 434, provides visibility/traceability and a required level of protection (e.g., expected controls and gaps) to instill trust in data assets and subsequent reporting. Reporting and UI Layer 432 may communicate with Risk Taxonomy 421, Policy and Standards Hierarchy 422, External Obligations 423, Control Taxonomy/Catalog 424 and Control Inventory 425. Other sources of data may include Standard of Care (Applicability) 438, Standard of Care (Control Requirements) 439 and Configuration Management Database (CMDB) (Technical Asset Classification Sensitivity) 426. Computational Risk Management 436 may support Data Catalog 427, Data Asset Classification (Criticality) 428, Process Ontology 429, Process Criticality Rating 430 and Quantified Risk Results and Metrics 431.

Graph Database Key Outputs 440 may include Expected Controls 442, Gaps 444, and Visibility into convergence and interdependencies 446.

Graph Solution 434 may provide key outputs to other sources, including Data Management 458 and Risk Quantification Tool 463.

Data Management 458 may represent a machine learning enhanced data quality rules engine. Features and functions may include Data Quality Findings 456 and Data Quality Controls 457.

Risk Quantification Tool 463 may represent a scenario analysis tool that provides annualized loss computations. Features and functions may include Risk Taxonomy 459, Process Criticality Rating 460, and Quantified Risk Results and Metrics 462.

The illustrative data risk ecosystem may also support other systems, such as IT Service Management 452 and Process Flow Management 455.

IT Service Management 452 may represent a platform providing technical management support and related workflows. Features and functions may include CMDB (Technical Asset Classification Sensitivity) 450 and Incidents 451.

Process Flow Management 455 may represent a business process modeling application. Features and functions may include Process Criticality Rating 453 and Process Ontology 454.

According to an illustrative application, Classification Engine 406 may support data asset classification 416 through Business Glossary 412. Reporting and UI Layer 432 and Computational Risk Management 436 may support Graph Solution 434 through Standard of Care (Applicability) 438 and Standard of Care (Control Requirements) 439 to generate key outputs, represented by Graph Database Key Outputs 440, as shown by Expected Controls 442, Gaps 444 and Visibility into convergence and interdependencies 446. Key outputs may be communicated to other sources, including Data Management 458 (e.g., data quality controls 457) and Risk Quantification Tool 463 (e.g., quantified risk results and metrics 462).

Figure 5A:
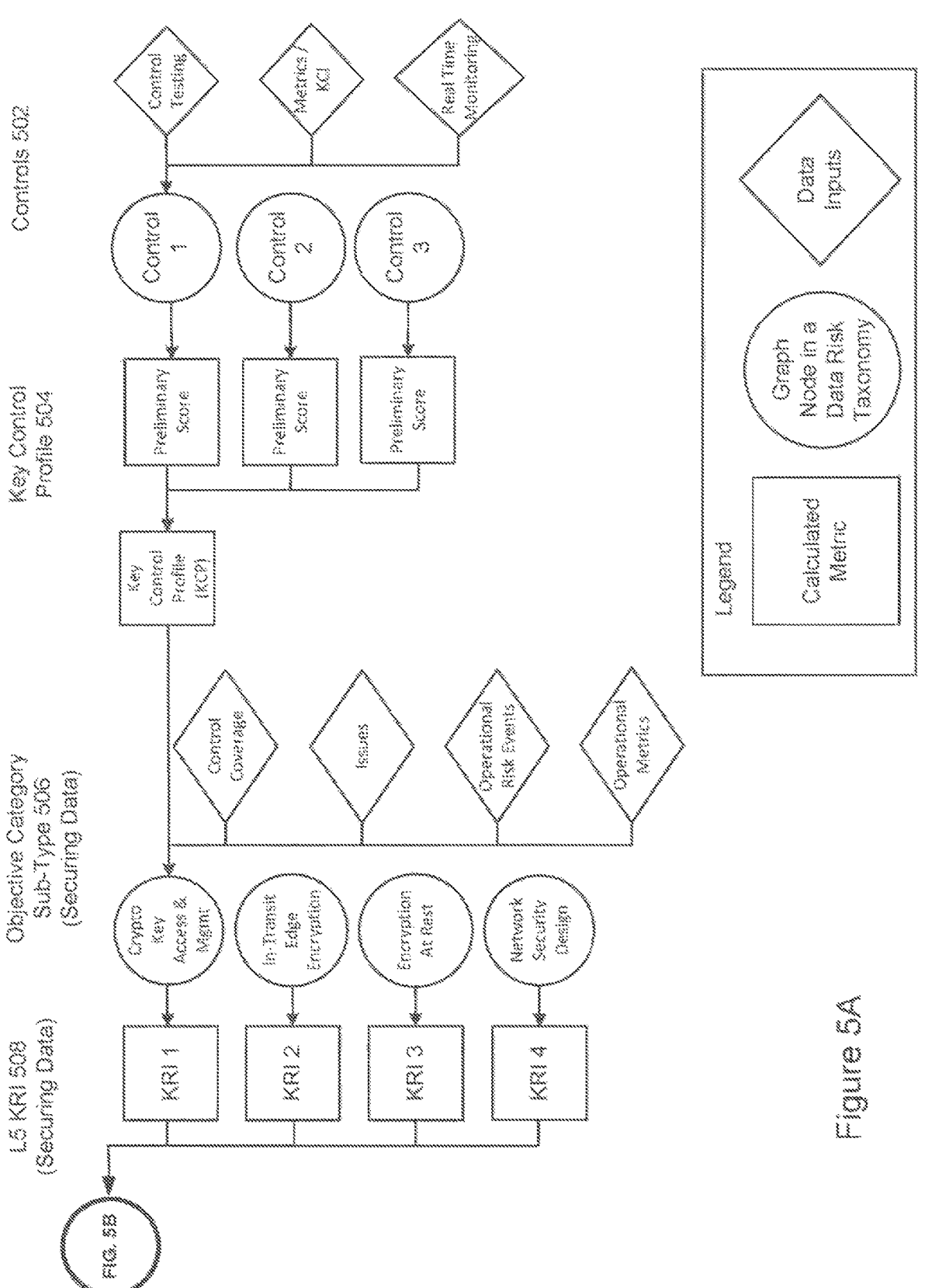
FIGS. 5A and 5B are an exemplary diagram illustrating data risk, according to an embodiment of the present invention.
Figure 5B:
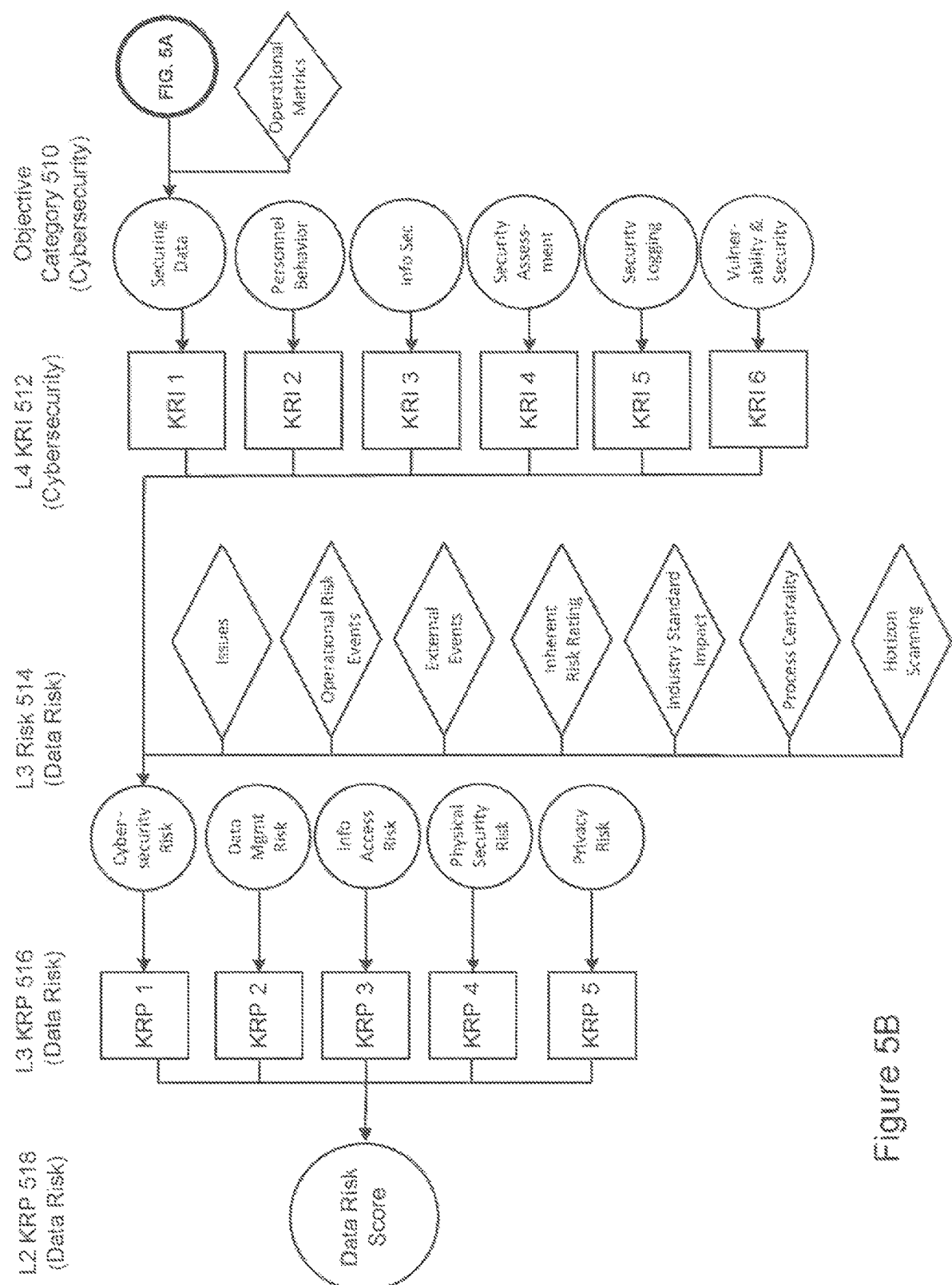

FIGS. 5A and 5B are an exemplary diagram illustrating data risk, according to an embodiment of the present invention. FIGS. 5A and 5B illustrate how data risk input information may be normalized and aligned to the standard of care taxonomy as scores and aggregated up a hierarchy. As shown in FIGS. 5A and 5B, information about risk and control that is typically generated by organizations may be normalized, weighted, aggregated and aligned to the standard of care taxonomy at various levels. This enables efficient aggregation and reporting to an organization's senior leadership and other recipients, and decomposition of the scores to their components parts to efficiently and accurately identify specific risk drivers. Further, it enables an organization to directly compare risk areas using scores (as opposed to subjective professional judgment) and observe risk trends over time. These scores may layer upon and enrich the existing standard of care taxonomy.

As shown in FIG. 5A, Controls 502 may include Control Testing, Metrics/KCI and Real-Time Monitoring. Each Control (as shown by Control 1, Control 2 and Control 3) may be transformed into corresponding Preliminary Scores. The Preliminary Scores may be used to generate a Key Control Profile (KCP) 504.

The Key Control Profile score for a control may be determined by aggregating and normalizing various input information about the control from the organization's GRC system. In this example, Controls may be aligned to a Level 5 node in a Data Risk Taxonomy based upon the type of risk the control mitigates.

Objective Category Sub-Types 506 may include Crypto Key Access and Management, In-Transit Edge Encryption, Encryption at Rest and Network Security Design, each corresponding to KRI 1, KRI 2, KRI 3 and KRI 4, respectively (as shown by L5 KRI 508).

For Crypto Key Access and Management, KCP scores may be enriched with normalized/weighted scores from additional inputs to become Level 5 Key Risk Indicators ("KRIs"), as shown by L5 KRI 508, that are aligned to the relevant area in the level 5 of the data risk taxonomy. They are added as a property on Level 5 nodes in the graph database. Additional inputs may include Control Coverage, Issues, Operational Risk Events and Operational Metrics.

As shown in FIG. 5B, Objective Category 510 may include Securing Data, Personal Behavior, Information Security, Security Assessment, Security Logging and Vulnerability and Security, each corresponding to KRI 1, KRI 2, KRI 3, KRI 4, KRI 5, KRI 6, respectively (as shown by L4 KRI 512).

For Securing Data, Level 5 KRIs may be aggregated into Level 4 KRIs (that are enriched with additional normalized inputs) that are aligned to the next higher level in the data risk taxonomy. They are added as a property on Level 4 nodes in the graph database.

Data Risk (as shown by L3 Risk 514) may include Cybersecurity Risk, Data Management Risk, Information Access Risk, Physical Security Risk and Privacy Risk, each corresponding to KRP 1, KRP 2, KRP 3, KRP 4, KRP 5, respectively (as shown by L3 KRP 516).

For Cybersecurity Risk, Level 4 KRIs may be aggregated into Level 3 Key Risk Profiles ("KRPs") and enriched with additional normalized inputs. They are added as a property on Level 3 nodes in the graph database. Additional inputs may include Issues, Operational Risk Events, External Events, Inherent Risk Rating, Industry Standard Impact, Process Centrality and Horizon Scanning.

As shown by Data Risk Score, Level 3 KRP scores may be further aggregated to provide an overall KRP score, as shown by L2 KRP 518, for the area of the risk taxonomy. The KRP may be aggregated even further to determine a Level 1 KRP score for all of Operational Risk, if so desired. They may be added as a property on Level 2 nodes in a graph database.

Intelligent Graph combines technology, AI, experience and expertise to deliver enterprise-level capabilities. The Intelligent Graph represents an integrated platform of graph technology that serves as a framework to explore, test and rapidly develop graph-based use cases across multiple domains.

An embodiment of the present invention is directed to storing and processing graph databases to represent relationship and hierarchical data for efficient computation; applying network science algorithms in addition to NLP and ML to connect and analyze data for specific use cases; and developing an intuitive user experience (UX) and enable the user to discover, understand and share the insights in an UI. Accordingly, an embodiment of the present invention may be supported by users with deep subject matter expertise and practice graph knowledge.

An embodiment of the present invention is directed to unifying technology, intelligence and user experience in a single seamless platform. Graph databases may organize information into an enterprise level connected data fabric. ML and NLP algorithms may leverage connected data to find new relationships and better answers for a variety of stakeholders. Intuitive UI enables decision makers to discover and understand insights in order to take action.

According to an exemplary workflow, a user may interact with an embodiment of the present invention to determine what controls are currently in place for a specific asset that is restricted. The user may initiate a search to determine what controls should be in place for the sensitivity and/or criticality to understand expected control objectives. This may also involve a gap analysis to determine what expected controls are currently not addressed. The user may further conduct a control assessment to understand if controls are operating as designed and effectively. The user may further initiate an inquiry to understand which obligation, policy, standard and industry standard the controls are attached with (and help comply with) and determine what additional controls need to be implemented for improved compliance and data risk management with those obligations, policy, standard and industry standards.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The foregoing descriptions provide examples of different configurations and features of embodiments of the invention. While certain nomenclature and types of applications/hardware are described, other names and application/hardware usage is possible and the nomenclature is provided by way of non-limiting examples only. Further, while particular embodiments are described, it should be appreciated that the features and functions of each embodiment may be combined in any combination as is within the capability of one skilled in the art. The figures provide additional exemplary details regarding the various embodiments.

Various exemplary methods are provided by way of example herein. The methods described can be executed or otherwise performed by one or a combination of various systems and modules.

The use of the term computer system in the present disclosure can relate to a single computer or multiple computers. In various embodiments, the multiple computers can be networked. The networking can be any type of network, including, but not limited to, wired and wireless networks, a local-area network, a wide-area network, and the Internet.

According to exemplary embodiments, the System software may be implemented as one or more computer program products, for example, one or more modules of computer program instructions encoded on a computer-readable medium for execution by, or to control the operation of, data processing apparatus. The implementations can include single or distributed processing of algorithms. The computer-readable medium can be a machine-readable storage device, a machine-readable storage substrate, a memory device, or a combination of one or more them. The term "processor" encompasses all apparatus, devices, and machines for processing data, including by way of example a programmable processor, a computer, or multiple processors or computers. The apparatus can include, in addition to hardware, software code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

A computer may encompass all apparatus, devices, and machines for processing data, including by way of example a programmable processor, a computer, or multiple processors or computers. It can include, in addition to hardware, code that creates an execution environment for the computer program in question, e.g., code that constitutes processor firmware, a protocol stack, a database management system, an operating system, or a combination of one or more of them.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computer-readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the embodiments have been particularly shown and described within the framework for conducting analysis, it will be appreciated that variations and modifications may be affected by a person skilled in the art without departing from the scope of the various embodiments. Furthermore, one skilled in the art will recognize that such processes and systems do not need to be restricted to the specific embodiments described herein. Other embodiments, combinations of the present embodiments, and uses and advantages of the will be apparent to those skilled in the art from consideration of the specification and practice of the embodiments disclosed herein. The specification and examples should be considered exemplary.

What is claimed is:

1. A computer-implemented system for data risk management, the system comprising:

an interface coupled to a client environment;

a graph database that stores and manages a variety of data, wherein the variety of data comprises one or more of the following data types:

at least one obligation represented by at least a portion of an entire law or regulation;

at least one industry best practice represented by at least a portion of an entire industry best practice document;

at least one mandate represented by one or more individual requirements identified from the at least one obligation and the at least one industry best practice;

at least one policy represented by one or more documents within an organization that establishes one or more high-level operational requirements;

at least one policy statement represented by one or more individual requirements identified from one or more policies;

at least one standard represented by one or more documents subservient to a parent policy within an organization that contains more detailed requirements than its parent policy;

at least one standard statement represented by one or more individual requirements identified from the at least one standard;

at least one risk represented by one or more risk statements that identify and describe a particular potential manifestation of a threat and its impact upon an organization;

at least one control objective represented by one or more control statements describing activities that must be conducted in order to mitigate risk and/or to satisfy one or more mandates wherein one or more control objectives are derived from the one or more control statements;

at least one control represented by documentation of activities that are performed to mitigate risk and/or to satisfy one or more mandates;

at least one asset represented by things of value within an organization that require governance, protection and management;

at least one key control indicator represented by a numerical measure of performance of one or more controls;

a set of sensitivity classification tiers represented by a series of sensitivity labels that are associated with one or more control objectives indicating that at least one control objective applies to an identified sensitivity tier; and a set of criticality classification tiers represented by a series of criticality labels that are associated with one or more control objectives indicating that at least one control objective applies to an identified criticality tier;

an intelligent graph platform coupled to the graph database, the intelligent graph platform representing how data is structured through a plurality of connected relationships; and a data risk management engine comprising a computer processor and coupled to the interface and the intelligent graph platform, the data risk management engine configured to perform the steps of:

receiving a query that identifies a dataset based upon one or more pre-configured rules;

responsive to the query, identifying and displaying a curated dataset based upon an entered sensitivity classification tier wherein a first population of control objectives that have previously been associated with the entered sensitivity tier are collated;

identifying and displaying another curated dataset based upon an entered criticality classification tier wherein a second population of control objectives that have previously been associated with the entered criticality classification tier are collated;

responsive to the query for sensitivity and criticality tier, (1) identifying at least one gap in one or more sensitivity controls comprising encryption and access control and (2) producing a set of expected control objectives for data commensurate with the identified sensitivity tier and identified criticality tier, and in light of the identified at least one gap;

generating a graphical representation illustrating a first set of relationships between one or more of: the control objectives, the policies, the policy statements, the standards, the standard statements, the mandates, the obligations, and the industry best practices;

modeling a plurality of relationships between components comprising the control objectives and information from the client environment;

running one or more what-if analyses, based on the modeled plurality of relationships, with at least one change within a data risk ecosystem to determine hypothetical upstream and downstream impacts;

generating a graphical representation illustrating the modeled plurality of relationships and highlighting the identified at least one gap;

transmitting the graphical representations to an interactive user interface through a communication network; and implementing at least one sensitivity control based on the set of expected control objectives, the at least one sensitivity control configured to secure data by implementation of one or more of in-transit edge encryption, encryption at rest, and crypto key access and management.

2. The system of claim 1, wherein the request is a query comprising one or more custom search parameters.

3. The system of claim 1, wherein the request relates to one or more of: control gap identification, a control assessment, policy and standard management, scenario analysis, risk metrics analysis, computational risk management, and client custom model.

4. The system of claim 1, wherein the entire law or regulation comprises the Gramm-Leach Bliley Act and wherein the entire industry best practice document comprises Control Objectives for Information Technologies published by ISACA (Information Systems Audit and Control Association).

5. The system of claim 1, wherein the things of value comprise: computer hardware, computer software, applications and data/information.

6. The system of claim 1, wherein the series of sensitivity labels comprise: restricted, confidential, nonpublic and public.

7. The system of claim 1, wherein the series of criticality labels comprise: enterprise critical data, line of business critical data and noncritical data.

8. The system of claim 1, wherein entering a high sensitivity tier returns a population of control objectives comprising encryption and access control to be satisfied by documenting and performing controls and wherein a low sensitivity classification tier returns a smaller population of control objectives.

9. The system of claim 1, wherein entering a high criticality classification tier returns a population of control objectives comprising data lineage and data quality to be satisfied by documenting and performing controls and wherein a low criticality classification tier returns a smaller population of control objectives to be satisfied.

10. The system of claim 1, wherein the client environment comprises: controls and metadata about controls, assets and metadata about assets.

11. A computer-implemented method for data risk management, the method comprising the steps of:

storing and managing, in a graph database, a variety of data, wherein the graph database is coupled to an intelligent graph platform that represents how data is structured through a plurality of connected relationships, and wherein the variety of data comprises one or more of the following data types:

at least one obligation represented by at least a portion of an entire law or regulation;

at least one industry best practice represented by at least a portion of an entire industry best practice document;

at least one mandate represented by one or more individual requirements identified from the at least one obligation and the at least one industry best practice;

at least one policy represented by one or more documents within an organization that establishes one or more high-level operational requirements;

at least one policy statement represented by one or more individual requirements identified from one or more policies;

at least one standard represented by one or more documents subservient to a parent policy within an organization that contains more detailed requirements than its parent policy;

at least one standard statement represented by one or more individual requirements identified from the at least one standard;

at least one risk represented by one or more risk statements that identify and describe a particular potential manifestation of a threat and its impact upon an organization;

at least one control objective represented by one or more control statements describing activities that must be conducted in order to mitigate risk and/or to satisfy one or more mandates wherein one or more control objectives are derived from the one or more control statements;

at least one control represented by documentation of activities that are performed to mitigate risk and/or to satisfy one or more mandates;

at least one asset represented by things of value within an organization that require governance, protection and management;

at least one key control indicator represented by a numerical measure of performance of one or more controls;

a set of sensitivity classification tiers represented by a series of sensitivity labels that are associated with one or more control objectives indicating that at least one control objective applies to an identified sensitivity tier; and a set of criticality classification tiers represented by a series of criticality labels that are associated with one or more control objectives indicating that at least one control objective applies to an identified criticality tier;

receiving, via an interface coupled to a client environment, a query that identifies a dataset based upon one or more pre-configured rules;

responsive to the query, identifying and displaying, via a data risk management engine, a curated dataset based upon an entered sensitivity classification tier wherein a first population of control objectives that have previously been associated with the entered sensitivity tier are collated;

identifying and displaying another curated dataset based upon an entered criticality classification tier wherein a second population of control objectives that have previously been associated with the entered criticality classification tier are collated;

responsive to the query for sensitivity and criticality tier, (1) identifying at least one gap in one or more sensitivity controls comprising encryption and access control and (2) producing a set of expected control objectives for data commensurate with the identified sensitivity tier and identified criticality tier, and in light of the identified at least one gap;

generating a graphical representation illustrating a first set of relationships between one or more of: the control objectives, the policies, the policy statements, the standards, the standard statements, the mandates, the obligations, and the industry best practices;

modeling a plurality of relationships between components comprising the control objectives and information from the client environment;

running one or more what-if analyses, based on the modeled plurality of relationships, with at least one change within a data risk ecosystem to determine hypothetical upstream and downstream impacts;

generating a graphical representation illustrating the modeled plurality of relationships and highlighting the identified at least one gap;

displaying, via an interactive user interface, the graphical representations through a communication network; and implementing at least one sensitivity control based on the set of expected control objectives, the at least one sensitivity control configured to secure data by implementation of one or more of in-transit edge encryption, encryption at rest, and crypto key access and management.

12. The method of claim 11, wherein the request is a query comprising one or more custom search parameters.

13. The method of claim 11, wherein the request relates to one or more of: control gap identification, a control assessment, policy and standard management, scenario analysis, risk metrics analysis, computational risk management, and client custom model.

14. The method of claim 11, wherein the entire law or regulation comprises the Gramm-Leach Bliley Act and wherein the entire industry best practice document comprises Control Objectives for Information Technologies published by ISACA (Information Systems Audit and Control Association).

15. The method of claim 11, wherein the things of value comprise: computer hardware, computer software, applications and data/information.

16. The method of claim 11, wherein the series of sensitivity labels comprise: restricted, confidential, nonpublic and public.

17. The method of claim 11, wherein the series of criticality labels comprise: enterprise critical data, line of business critical data and noncritical data.

18. The method of claim 11, wherein entering a high sensitivity tier returns a population of control objectives comprising encryption and access control to be satisfied by documenting and performing controls and wherein a low sensitivity classification tier returns a smaller population of control objectives.

19. The method of claim 11, wherein entering a high criticality classification tier returns a population of control objectives comprising data lineage and data quality to be satisfied by documenting and performing controls and wherein a low criticality classification tier returns a smaller population of control objectives to be satisfied.

20. The method of claim 11, wherein the client environment comprises: controls and metadata about controls, assets and metadata about assets.

21. A computer-implemented system for data risk management, the system comprising:

an interface coupled to a client environment;

a graph database that stores and manages a variety of data, wherein the variety of data comprises at least one of an internal obligation, an external obligation, a governance artifact, and a key control indicator, as well as a set of sensitivity classification tiers and a set of criticality classification tiers;

an intelligent graph platform coupled to the graph database, the intelligent graph platform representing how data is structured through a plurality of connected relationships; and a data risk management engine comprising a computer processor and coupled to the interface and the intelligent graph platform, the data risk management engine configured to perform the steps of:

receiving a query that identifies a dataset based upon one or more pre-configured rules;

responsive to the query, identifying and displaying a curated dataset based upon an entered sensitivity classification tier wherein a first population of control objectives that have previously been associated with the entered sensitivity tier are collated;

identifying and displaying another curated dataset based upon an entered criticality classification tier wherein a second population of control objectives that have previously been associated with the entered criticality classification tier are collated;

responsive to the query for sensitivity and criticality tier, (1) identifying at least one gap in one or more sensitivity controls comprising encryption and access control and (2) producing a set of expected control objectives for data commensurate with the identified sensitivity tier and identified criticality tier, and in light of the identified at least one gap;

generating a graphical representation illustrating a first set of relationships between one or more of: the control objectives, the policies, the policy statements, the standards, the standard statements, the mandates, the obligations, and the industry best practices;

modeling a plurality of relationships between components comprising the control objectives and information from the client environment;

running one or more analyses, based on the modeled plurality of relationships, with at least one change within a data risk ecosystem to determine potential upstream and downstream impacts;

generating a graphical representation illustrating the modeled plurality of relationships and highlighting the identified at least one gap;

transmitting the graphical representations to a user interface through a communication network; and implementing at least one sensitivity control based on the set of expected control objectives, the at least one sensitivity control configured to secure data by implementation of one or more of in-transit edge encryption, encryption at rest, and crypto key access and management.

\* \* \* \* \*